United States Patent [19]

Maddocks

[11] Patent Number: 4,540,082
[45] Date of Patent: Sep. 10, 1985

[54] VIBRATORY DISTRIBUTION SYSTEM

[75] Inventor: Keith L. Maddocks, Barton, England

[73] Assignee: KMG Systems Limited, Bedfordshire, England

[21] Appl. No.: 495,398

[22] Filed: May 17, 1983

[51] Int. Cl.³ .............................................. B65G 37/00
[52] U.S. Cl. ..................................... 198/358; 198/370; 198/609
[58] Field of Search ............... 198/370, 368, 358, 609, 198/771, 360, 366, 768, 524, 560; 414/293, 294, 296, 415

[56] References Cited

U.S. PATENT DOCUMENTS

| | | | |
|---|---|---|---|
| 2,457,267 | 12/1948 | Peale et al. | 198/609 |
| 2,507,251 | 5/1950 | Herold | 198/609 |
| 2,742,138 | 4/1956 | Potter et al. | 198/609 |
| 3,279,592 | 10/1966 | Kerkvliet | 198/370 |
| 3,917,050 | 11/1975 | Gregor | 198/358 |
| 3,927,758 | 12/1975 | Gregor | 198/524 |

FOREIGN PATENT DOCUMENTS

| | | | |
|---|---|---|---|
| 521491 | 3/1955 | Italy | 198/609 |
| 578238 | 10/1977 | U.S.S.R. | 198/768 |

*Primary Examiner*—Joseph E. Valenza
*Assistant Examiner*—Kyle E. Shane
*Attorney, Agent, or Firm*—Burns, Doane, Swecker & Mathis

[57] ABSTRACT

A vibratory distribution system for flowable material such as bulk food products has a number of vibratable cascaded elongate primary conveyor channel sections tilted to one side about their longitudinal axes to cause the product to gravitate towards the lower side wall of each section. Each side wall has an opening through which product falls into a respective secondary conveyor section which carries the product to packaging. The flow rate of product can be precisely controlled by selective activation of the conveyor section, and by varying the vibration amplitude of the operating conveyor sections.

10 Claims, 5 Drawing Figures

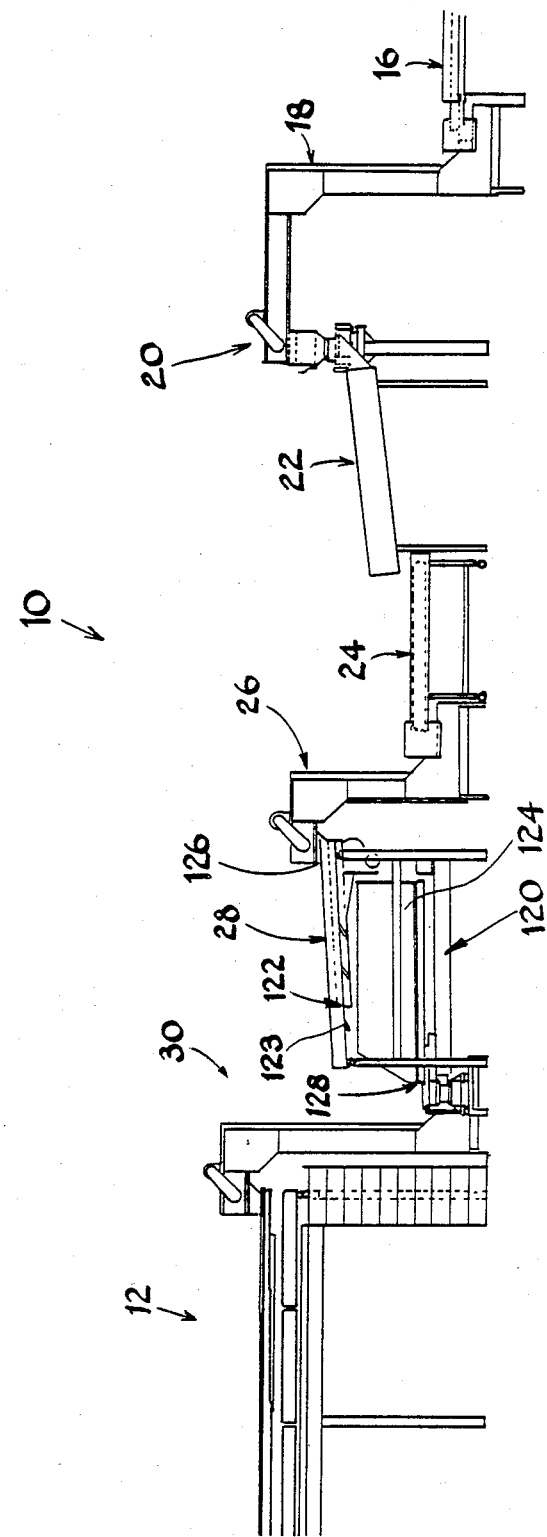

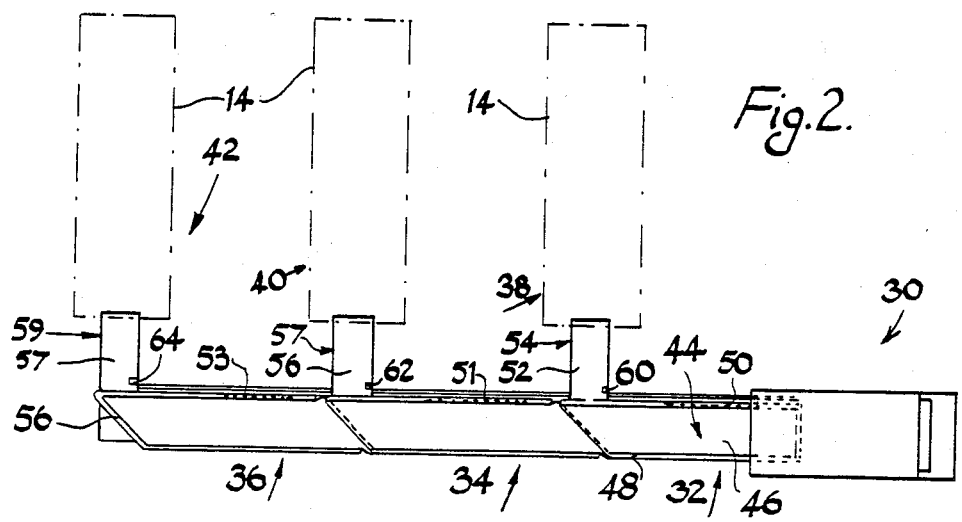
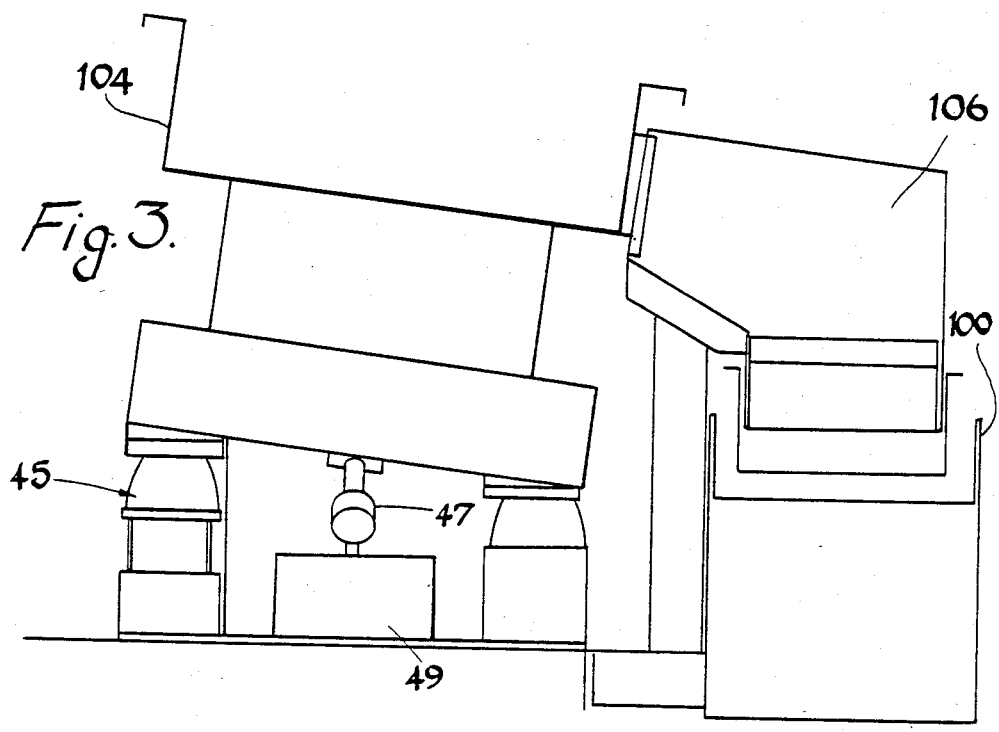

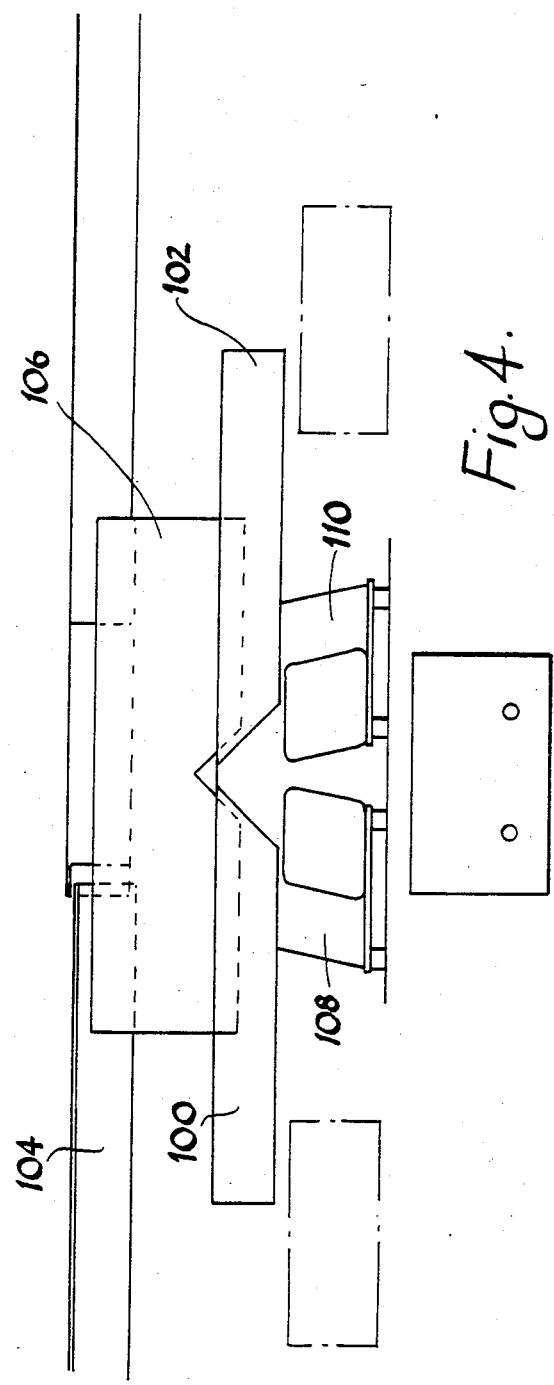

VIBRATORY DISTRIBUTION SYSTEM

FIELD OF INVENTION

The present invention relates to a distribution system for flowable materials.

BACKGROUND OF THE INVENTION

Distribution systems are used, inter alia, for conveying bulk food products such as crisps, cornflakes and similar products of relatively low mass and irregular shape from a source such as an oven to a number of processing points at which the product is, for example, packaged by packing machines which dispense metered quantities of the product of successively presented packages or containers.

One of the problems associated with such distribution systems is ensuring that the supply of food products is sufficient to meet the demand at all of the processing points since failure to do so can result in product starvation at the processing points and consequent production of underweight packages. One known form of distribution system attempts to solve this problem by conveying the food product in a closed path along which the various processing points are located. Product which is not immediately used continues to be conveyed along the closed path until eventually required. A disadvantage of this system is that food products such as crisps and cornflakes are quite fragile and the longer the products spend in the distribution system the more likelihood there is of the packaged product containing an unacceptably high level of broken or powdered product. In addition, the products also tend to degrade if left exposed to the air for any appreciable time.

In a further known system quantities of product are amassed at each processing point and dropped through an opened gate into a storage hopper of a packaging machine at the processing point. A disadvantage of this system is that the sudden discharging of a large quantity of product into the packaging machine hopper can effect the accuracy of the machine and result in large variations in the quantity of product metered to each package. Since such machines have to be set to ensure that the metered quantity of product does not fall below the quantity specified on the package the metered quantity can be as much as 50% greater than the specified quantity which is clearly undesirable.

OBJECT AND SUMMARY OF THE INVENTION

The present invention seek to provide an improved form of distribution system.

Accordingly the present invention provides a distribution system for conveying flowable material from a source downstream to a plurality of successive user locations, comprising: a conveyor means having a plurality of successive, elongate primary conveyor sections each of which is vibratable for conveying said material towards a respective one of said locations, each conveyor section having a product-carrying surface tilted relative to the horizontal about the longitudinal axis of the conveyor section whereby said product tends to gravitate towards the lower side edge region of said surface as the product travels along said section and a side wall upstanding on said lower side edge region for retaining the product on the conveyor section; and wherein each said side wall has an opening for allowing product to fall from said conveyor section; and a plurality of vibratable secondary conveyor sections for receiving the fallen product and conveying said product to each said user location.

The present invention also comprises a product storage unit for connection in a product feed line, the storage unit comprising a lower conveyor section for conveying product to an outlet of the storage unit; and an upper conveyor section for conveying product from an inlet of the storage unit, the upper conveyor section overlying the lower conveyor section and having a plurality of gates in its lower surface for allowing product to fall onto said lower conveyor section, said upper and lower conveyor sections being independently operable.

Advantageously, each of said secondary conveyor sections is independently operable. The primary conveyor sections are preferably cumulatively operable in a downstream direction, that is where all of the primary conveyor sections are switched off then the switching on of a primary conveyor section at any point in the conveyor line automatically switches on all the primary conveyor sections upstream of that point.

In a preferred embodiment of the present invention the downstream end of each primary conveyor section overlaps the immediately following conveyor section and has its downstream end cut away at a preselected acute angle to the side wall, the angle preferably being 45°. Each conveyor section is vibrated at a frequency less than the natural resonant frequency of the conveyor section. For example where the natural frequency is 1500 Hz the conveyor section is vibrated at a frequency of typically 1410 Hz. The conveyor sections are preferably mounted on rubber blocks and displaced in the direction of their longitudinal axis against the action of the rubber blocks by a single-acting piston-cylinder unit whose piston rod abuts against a suitable surface on the conveyor section. The unit is conveniently hydraulically driven by a pump which applied hydraulic pressure pulses to the unit at the required frequency, the return resistance of the piston of the unit being such that the piston rod is maintained in abutment with the conveyor section surface during the return stroke of the conveyor section under the action of the rubber blocks. Of course, any suitable resilient connection may replace the use of rubber blocks.

The secondary conveyor sections are conveniently vibrated by electromagnetic means to facilitate control of the amplitude of vibration. This enables the feed rate of product along the secondary conveyor sections to be controlled. As will be appreciated, such control can be effected on either or both the primary or secondary conveyor sections.

In a preferred form of the storage unit the gates are independently controlled such that when the lower conveyor section is switched off the gates can be opened successively beginning with the gate furthest downstream on the upper conveyor section to fill the lower conveyor section progressively from the outlet of the storage unit.

The provision of a storage unit in the product feed line enables operation of the feed line upstream of the storage unit to continue in the event of a temporary breakdown or blockage in the feedline downstream of the storage unit.

BRIEF DESCRIPTION OF THE DRAWING

The present invention is further described hereinafter, by way of example, with reference to the accompanying drawings, in which:

FIG. 1 is a side elevation of a food product feedline;
FIG. 2 is a plan view of the distribution system of FIG. 1;
FIG. 3 is an end elevation of a preferred form of distribution system according to the present invention;
FIG. 4 is a front elevation of the system of FIG. 3.

DETAILED DESCRIPTION OF THE PREFERRED EMBODIMENTS

Figure 5:
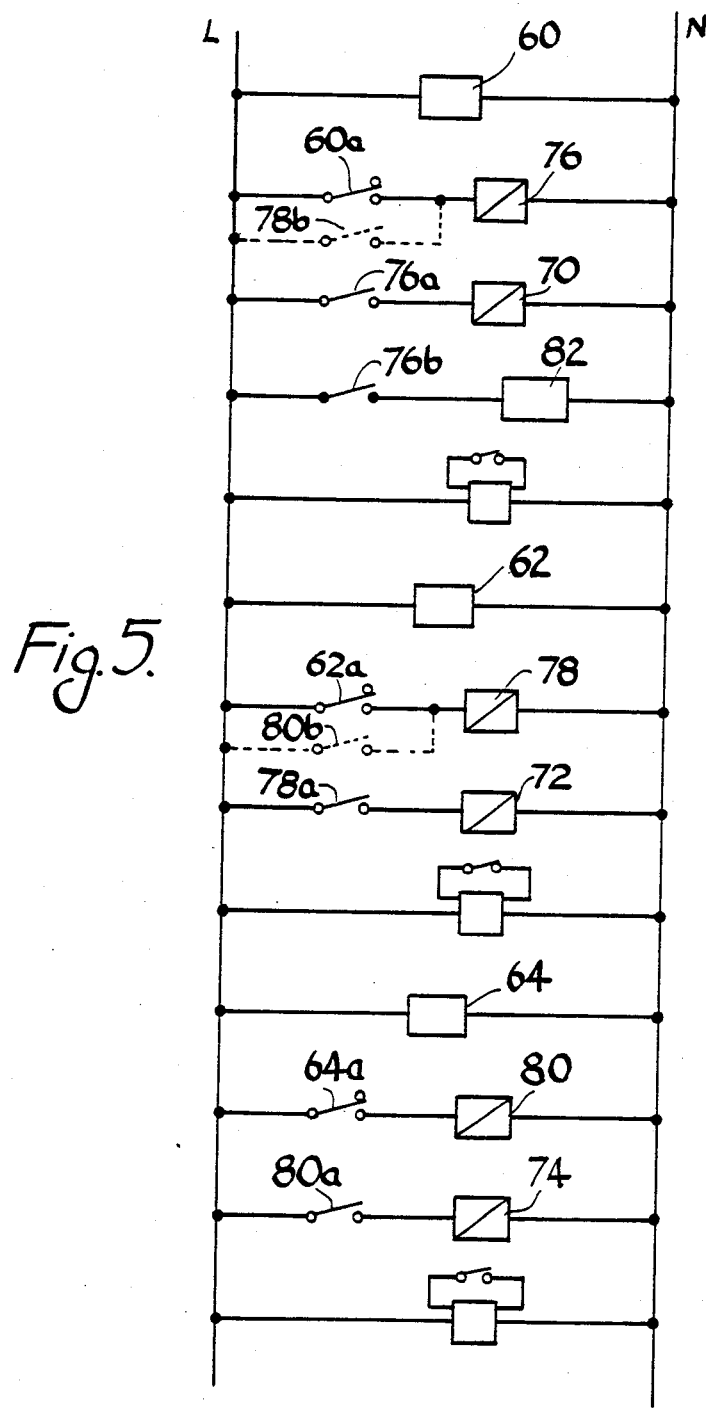
FIG. 5 is a ladder network schematic diagram of the control circuit of the distribution system of FIGS. 2 to 4.

In the drawings, FIGS. 1 and 2 show a feed line 10 for feeding a product such as crisps from an oven (not shown in the drawings) to a distribution system 12 which distributes the products to, for example, packaging machines 14 located at respective user locations. The product is conveyed from right to left as seen in the drawings from a deoiling conveyor 16 up a bucket elevator 18 and along a transfer conveyor 20 into a flavour drum 22. The product is discharged from the flavour drum 22 onto an inspection belt 24 from which it is carried by a further bucket conveyor to a storage unit 28 which is described in greater detail below. In the normal operation of the line the product passes directly through the storage unit 28 and is carried by a third bucket elevator 30 to the product distribution system 12.

The distribution system is shown in greater detail in FIG. 2 and comprises a number, for example 3, of conveyor modules 32, 34 and 36 associated with respective user locations 38, 40 and 42 at which packaging machines 14 are located. The conveyor modules are arranged in nested form to provide a continuous flow path of product from the bucket elevator 30 to the user locations. The conveyor modules are substantially identical and only the first conveyor module, module 32, is described below in detail. It will be appreciated, therefore, that the following description of module 32 applied equally to modules 34 and 36.

The conveyor module 32 comprises an elongate vibratory conveyor section which includes a product-carrying tray 44. The Tray 44 has a product-carrying base surface 46 and two upstanding side walls 48, 50. The term "wall" is used here to denote any suitable form of barrier to retain the product on the tray 44. The tray is orientated with its longitudinal axis substantially horizontal (a slight downward tilt in the direction of product feed may be provided to assist flow of the product along the conveyor section) but is tilted relative to the horizontal about its longitudinal axis so that the side wall 50 adjacent the associated user location is at a lower elevation than the opposite side wall 48. The angle of tilt need not be excessive, the angle being typically 10° and results in a tendancy for the product to accumulate on the right hand side of the tray 44, as seen in the direction of product feed, against the side wall 50.

The side wall 50 is provided with an opening at or adjacent the downstream end of the tray 44 to allow product to fall from the tray 44 onto a tray 52 of a secondary conveyor section 54 of a further conveyor module. The latter is arranged with its longitudinal axis preferably extending substantially at right angles to the axis of the conveyor section 44 to carry product to the associated packaging machine 14. The tray 52 of the conveyor section 54 is conveniently horizontal although again a slight tilt in the downward direction may be provided to assist product flow. In addition, the elevation of the tray 52 relative to the tray 44 is such that the product has only a relatively short fall, typically one inch from the tray 44 to the tray 52. Although the conveyor section 54 as shown comprises a single tray 52 it may alternatively comprise a number of narrow trays arranged side by side.

The donwstream and edge of the tray 44 overlaps the beginning of the tray of the next successive conveyor module 34 with a vertical drop of typically one inch between the two product carrying surfaces of the trays.

The tray 44 is resiliently supported on a series of resilient members 45, preferably blocks of rubber or plastics material and is vibrated by means of a single-acting piston-cylinder unit 47 located beneath the tray and whose piston rod extends generally in the direction of product flow and abuts a stop surface on the tray 44. The piston-cylinder unit is preferably hydraulically operated by a hydraulic motor 49 which delivers pressure plulses to the unit to extend the piston rod and drive the tray 44 against the reaction of the resilient blocks a pre-selected distance in the downstream direction. Each time the pressure pulse is relieved the resilient blocks draw the tray 44 back to its rest position retracting the piston rod at the same time.

The resistance of the piston rod to retraction is arranged such that the piston rod is maintained in abutment with the tray stop surface during the return stroke of the tray. The amplitude of vibration is adjustable by adjustment of the motor to vary the piston stroke.

The pressure pulses are applied to the piston-cylinder unit at a frequency below that of the natural resonant frequency of the conveyor section. For example, with a conveyor section having a natural resonant frequency of 1500 Hz the pressure pulses are delivered at a frequency of typically 1410 Hz. Actuation of the piston-cylinder unit is controlled by a solenoid-actuated control valve in the fluid line from the motor to the unit so that the motor can be run continuously regardless of whether the piston-cylinder unit is actuated to vibrate the tray 44 or not.

The tray 52 of the secondary conveyor section 54 is mounted in a similar manner to the tray 44 but is preferably vibrated using an electromagnet which is pulse energised at a preselected pulse frequency to provide the desired frequency of vibration of the tray 52. As will be appreciated, the vibratory action of both trays 44 and 52 is generally in the direction of their longitudinal axes to ensure product movement towards the user locations. The use of an electromagnet to vibrate the tray 52 enables the amplitude of vibration of the tray 52 to be controlled by varying the amplitude of the energising pulses applied to the electromagnet. Variation in the amplitude of the vibration varies the rate at which product moves along the tray 52 and therefore provides an effective and simple way of controlling the product feed rate to the associated packaging machine 14.

As will be appreciated, each of the trays 44 and 52 may be vibrated by means of a hydraulic or electromagnetic drive system, as desired.

The control valves controlling the hydraulic fluid lines from the hydraulic motor of each conveyor module to the associated piston-cylinder unit are solenoid-actuated valves which are controlled through a relay circuit by a respective product metering device 60, 62, 64 located adjacent the opening in the side wall 50 of each tray 44 to measure the quantity of product falling from the tray 44 of each primary conveyor section onto the tray 52 of the associated secondary conveyor section 54. The product metering devices are preferably photoelectric sensors which operate to regulate the amount of product transferred to the associated secondary conveyor system section. For example, where the sensor 62 senses too much product on the tray 56 it closes the associated control valve of the conveyor module 34 to deactuate the piston-cylinder unit. Vibration of the primary conveyor section of the module 34 therefore ceases and the flow of product onto the tray 56 is temporarily halted. However, while the tray 56 continues to vibrate the product which has accumulated on the tray continues to be carried towards the packaging machine 40. Once the sensor 62 senses that the product which has accumulated on the tray 56 has been reduced to an acceptable level it automatically opens the control valve so that vibration of the tray of the conveyor module 34 recommences and product is once more supplied to the tray 56.

If, for any reason, product feed to one of the packaging machines such as that fed by conveyor section 57 is temporarily stopped by deactivating the drive system of the conveyor section 57 it might be thought that continued vibration of the upstream primary conveyor sections could result in an overflow of product onto the tray 56. In practice this does happen initially but the build up of product on the tray 56 adjacent the primary conveyor section tray opening acts as a wall to prevent further product exiting through the opening onto the tray 56. The product thus continues to travel downstream along the primary conveyor sections, bypassing the tray 56.

Conversely, if, for example, the vibratory drive system of the conveyor module 36 is switched off, product builds up at the upstream end of the module tray to form a barrier across the tray and, because of its angle to the product flow path, deflects product through the adjacent opening onto the tray 56.

FIG. 5 is a circuit diagram of the control circuit showing the interconnections between the sensors 60, 62 and 64 and solenoids 70, 72 and 74 of the control valves. Each sensor 60, 62 and 64 controls a respective relay 76, 78, 80 whose contacts in turn control the associated solenoid 70, 72, 74. When the sensor 60 senses a lack of product it closes an associated switch 60a to energise relay 76. The relay 76 has two pairs of normally open contacts, one pair 76a closing to energise the solenoid 70 of the associated control valve and initiate vibration of the tray of the conveyor module 32, and the other pair 76b closing to close the power supply circuits 82, for example for the bucket elevator 30 preceding the distribution system to supply product to the first conveyor module 32. The sensor 62, on sensing a lack of product closes an associated switch 62a to energise a further relay 78. This relay has two pairs of contacts, one contact pair 78a closing to energise the solenoid 72 of the control valve to initiate vibration of the tray of the second conveyor module 34, and the other contact pair 78b closing to energise the relay 76 and thus solenoid 76 of the control valve of the preceding conveyor module 32. This ensures that the trays on both the conveyor module 32 and 34 vibrate to supply product to the secondary conveyor section 57. The third sensor 64 operates in similar manner. On sensing a lack of product on the tray 57 it closes an associated switch 64a to energise the associated relay 80. This relay has two contact pairs, 80a and 80b. The contact pair 80a control the solenoid 74 of the control valve of the third conveyor module 36 while the contact pair 80b control the relay 78. Since the relay 78 in turn also controls the relay 76 the energising of the relay 80 results in the drive systems for the trays of each of the conveyor modules 36, 34 and 32 being energised to vibrate all of the trays carrying food product to the tray 57 of the secondary conveyor section 59. The circuit of FIG. 5 is therefore arranged to ensure that where any one sensor senses a lack of product on the associated secondary conveyor section the drive systems of all of the conveyor modules upstream of that secondary conveyor section are energised to carry product to that section.

In a modified form of the distribution system each primary conveyor section feeds, for example two packaging machines or a packaging machine having two hopper inlets. This is effected as shown in FIGS. 3 and 4, by providing two secondary conveyor sections 100 and 102 which are fed from the same primary conveyor section 104 through a chute 106. Each secondary conveyor section 100, 102 is independently vibrated by means of a respective electromagnet 108, 110 so that the two hopper inlets of the same or respective packaging machines can be fed at differing rates.

Referring again to FIG. 1 the product feed line includes, as mentioned earlier, a storage unit 28. This unit comprises lower and upper conveyor sections 120, 122 which are similar to the conveyor modules previously described with reference to the distribution system 12. The lower conveyor section 120, however, forms the base of a container 124 in which the product can accumulate. The storage unit has an inlet 126 through which product is fed to the upper conveyor section 122. The latter has a number of gates 123 provided in its base which can be opened to allow product to fall through into the container 124. The storage unit has an outlet 128 which is arranged at the downstream end of the lower conveyor section 120. Normally, in product feed lines if a blockage occurs, for some reason, in the feed line then the flow of product has to be stopped at source.

Where the source is an oven, for example where the product being fed is crisps or the like, any blockage in the feed line means that the oven has to be shut down and as will be appreciated, this is a time consuming and relatively expensive operation. The provision of the storage unit 28 in the product feed line allows the operation of the oven and the feed line upstream of the storage unit 28 to continue for a period when a blockage or stoppage occurs in the line downstream of the storage unit 28. If the lower conveyor section 120 of the storage unit is deactuated then product will accumulate in the container 124 until the storage unit is full. The time to fill the container will, of course, depend upon the size of the container and the rate of feed of product along the line. However, a typical time of fifteen minutes is normally adequate to enable any temporary stoppage downstream of the storage unit to be cleared.

Control of the gates in the upper conveyor section 122 is preferably effected such that when the lower conveyor section is deactuated the gates are opened successively beginning with the gate nearest the downstream end of the upper conveyor section 122 to fill the container 124 with product from its downstream end.

This ensures that when the lower conveyor section 120 is reactuated to recommence product feed downstream of the storage unit product is immediately available at the outlet 128.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A distribution system for conveying flowable material from a source downstream to a plurality of successive user locations, comprising:
    a conveyor means comprising a plurality of successive, elongate primary conveyor sections, each conveyor section having a product carrying surface tilted relative to the horizontal about the longitudinal axis of the conveyor section whereby said product tends to gravitate towards the lower side edge region of said surface as the product travels along said section, and a side wall upstanding on said lower side edge region for retaining the product on the conveyor section;
    means for vibrating each said primary conveyor section for conveying said material towards a respective one of said locations;
    and wherein each said side wall has an opening for allowing product to fall from said conveyor section;
    a plurality of vibratable secondary conveyor sections for receiving the fallen product and conveying said product to each said user location; and
    a flowable product storage unit arranged upstream of said conveyor means, the storage unit comprising:
    inlet and outlet means;
    a lower conveyor section connected to said outlet means;
    an upper conveyor section connected to said inlet means, said upper conveyor section overlaying said lower conveyor section;
    respective means for vibrating said conveyor sections for conveying product from said inlet means and to said outlet means; and
    a plurality of gates in the lower surface of said upper conveyor section for allowing product conveyed along said upper conveyor section to fall onto said lower conveyor section.

2. A system as claimed in claim 1 wherein said vibrating means is operable to vibrate each said secondary conveyor section independently of each other said secondary conveyor section and is operable to vibrate said primary conveyor sections cumulatively in a downstream direction.

3. A system as claimed in claim 1 or 2 wherein the downstream end of each primary conveyor section overlaps the immediately following conveyor section and has its downstream end cut away at a preselected acute angle to the sidewall.

4. A system as claimed in claim 3 wherein said angle is 45°.

5. A system as claimed in claim 2 wherein said vibrating means is operable to vibrate each said conveyor section at a frequency less than the natural resonant frequency of the conveyor section.

6. A system as claimed in claim 1 or 2 further comprising a respective resilient mounting supporting each said conveyor section and wherein said vibrating means is operable repeatedly to displace each conveyor section in the direction of its longitudinal axis against the action of the resilient mounting to vibrate said section.

7. A system as claimed in claim 6 wherein said vibrating means for at least one of said conveyor sections comprises a respective single-acting piston-cylinder unit whose piston rod engages against a suitable surface on said conveyor section.

8. A system as claimed in claim 7 wherein said vibrating means further comprises a hydraulic pump operable to apply hydraulic pressure pulses to said piston-cylinder unit at a desired frequency, the return resistance of the piston of the unit being such that the piston rod is maintained in engagement with the conveyor section surface during the return stroke of the conveyor section under the action of the resilient mounting.

9. A system as claimed in claim 1 further comprising electromagnetic means for vibrating at least the secondary conveyor sections.

10. A system as claimed in claim 1 further comprising means for controlling said gates, said means being operable when said lower conveyor section is inoperable to open said gates successively beginning with the gate furthest downstream on said upper conveyor section to fill the lower conveyor section progressively from said outlet means.

* * * * *